Patented Feb. 13, 1923.

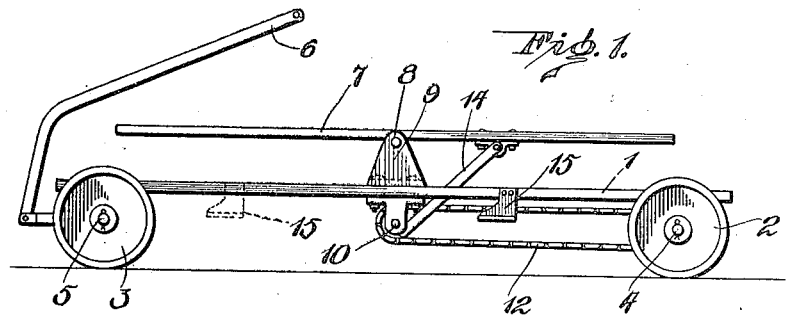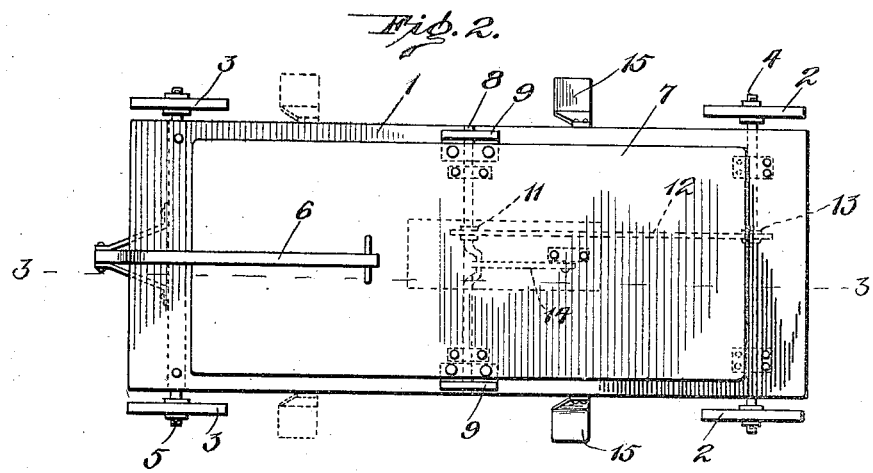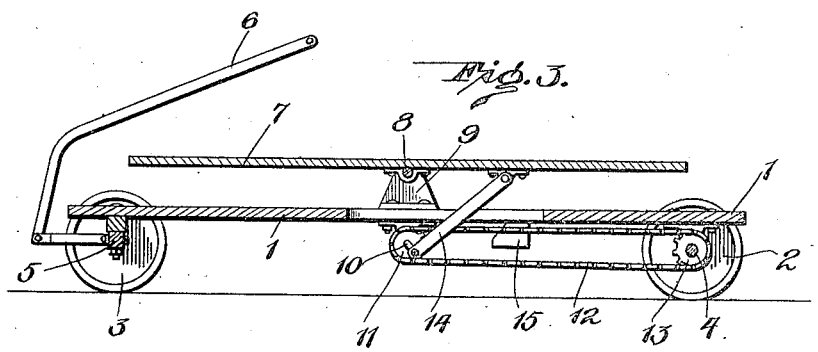

1,445,472

UNITED STATES PATENT OFFICE.

LOUIS D. BARR, OF TACOMA, WASHINGTON.

CHILD'S VEHICLE.

Application filed March 2, 1922. Serial No. 540,532.

*To all whom it may concern:*

Be it known that LOUIS D. BARR, a citizen of the United States, and residing at Tacoma, in the county of King and State of Washington, has invented certain new and useful Improvements in Children's Vehicles, of which the following is a specification.

This invention relates to an improvement in amusement vehicles, adapted to be manually propelled by the rider thru an appropriate movement of his body while seated on the vehicle.

The improvement contemplates the provision of a rocking element supported above the platform of the vehicle and connected by a pitman to a crank mounted below the platform, with the crank in turn operating the rear wheels of the vehicle. Rigid feet support or stirrups are provided on the platform, so that the rider may alternately apply his weight to the rocking element and relieve said element of said weight, in order to induce the necessary rocking movement thereof for the operation of the wheels.

The invention is illustrated in the accompanying drawings, in which:—

Fig. 1 is a view in side elevation of the improved vehicle.

Fig. 2 is a plan of the same.

Fig. 3 is a section on line 3—3 of Fig. 2.

The improved vehicle comprises a platform 1 of appropriate length and width, supported on rear and forward wheels 2 and 3, thru appropriate axles 4 and 5, the latter being arranged for steering thru a handle or similar member 6.

An operating member 7, of appropriate width and length, is supported for rocking movement on a pivot rod 8 mounted in uprights 9 rising from the platform. A crank shaft 10 is supported below the platform, on which is mounted a sprocket wheel 11, connected by a sprocket chain 12 to a sprocket 13 on the axle of the rear wheels 2, whereby movement of the crank will operate said rear wheels. The crank throw of the crank shaft 10 is connected by a pitman 14 with the operating member 7, to one side of the pivotal support thereof. Stirrups 15 are secured to the platform 1 in position to receive the feet of the rider, it being apparent that such stirrups may, as indicated in dotted lines in Fig. 1, be arranged either forwardly or rearwardly of the pivotal support of the operating member, or both as preferred.

In the event of a single rider, after initial movement is given the vehicle, the vehicle will be propelled by the rider applying his weight to the operating member 7 at one side of the pivot, in order to force one side of said member downwardly and thru the pitman 14, operate the crank shaft to turn the rear wheels. When the operating member or that section on which the rider is seated has reached its lowest point, the rider will relieve the operating member of his weight by rising on the stirrups 15 as supports, as will be obvious. The momentum will carry the vehicle forward, causing the depressed portion of the operating member to again rise, whereupon the operator again subjects this portion of the member 7 to his weight. Repetition of this action will obviously cause propulsion of the vehicle.

The particular vehicle shown and described is obviously more readily propelled by two riders, one supported on each section of the operating member beyond the pivot, as the weight of the riders will thus alternate and positive movement of the operating member in both directions will be provided for. The stirrups 15 have an important function, as they support the weight of the rider when it is necessary for him to relieve the operating member of his weight, in order to provide for proper operation of the device.

Claim:

A child's vehicle, comprising a platform, a pair of driving wheels supporting the rear end of the platform, a crank shaft mounted beneath the platform and connected with the driving wheels for operating the latter, an operating member supported for rocking movement above the platform, a link connecting said member and the crank, stirrups secured to the platform in position to receive and support the weight of the rider, a front axle carrying front supporting wheels pivotally mounted on the platform, a handle bent intermediate its ends having one end pivotally connected to the front axle and the other end extending over the operating member to be grasped by the operator, whereby an operator may alternately apply and relieve his weight on the member and produce a rocking motion for propelling the vehicle and may also grasp the handle for steering the vehicle, the handle also serving to draw the vehicle by an operator in front of it.

In testimony whereof I affix my signature in the presence of two witnesses.

LOUIS D. BARR.

Witnesses:
L. C. STEVENSON,
D. O. CHAMBERLAIN.